(12) United States Patent
Wang et al.

(10) Patent No.: US 10,185,115 B2
(45) Date of Patent: Jan. 22, 2019

(54) INSERT MOLDED LENS DRIVING APPARATUS

(71) Applicant: TDK TAIWAN CORP., Yangmei, Taoyuan County (TW)

(72) Inventors: Hung-Lin Wang, Yangmei (TW);
Chen-Chi Kuo, Yangmei (TW);
Shou-Jen Liu, Yangmei (TW);
Kun-Shih Lin, Yangmei (TW)

(73) Assignee: TDK TAIWAN CORP., Yangmei, Taoyuan County (TW)

( * ) Notice: Subject to any disclaimer, the term of this patent is extended or adjusted under 35 U.S.C. 154(b) by 303 days.

(21) Appl. No.: 14/986,976

(22) Filed: Jan. 4, 2016

(65) Prior Publication Data
US 2017/0075086 A1 Mar. 16, 2017

(30) Foreign Application Priority Data
Sep. 10, 2015 (TW) .............................. 104129909 A (51) Int. Cl.
*G02B 7/02* (2006.01)
*H02K 41/035* (2006.01)
(52) U.S. Cl.
CPC ............. *G02B 7/023* (2013.01); *G02B 7/026* (2013.01); *H02K 41/0356* (2013.01)

(58) Field of Classification Search
CPC ........ H02K 41/0356; H02K 3/46; H02K 3/50; H02K 33/18; G02B 7/023; G02B 7/026; G02B 7/08
See application file for complete search history.

(56) References Cited

U.S. PATENT DOCUMENTS

2007/0133110 A1* 6/2007 Huang ................... G02B 7/023
359/824

FOREIGN PATENT DOCUMENTS

JP     2011085682 A  *  4/2011

OTHER PUBLICATIONS

English Translation of JP-2011085682 A document.*

\* cited by examiner

*Primary Examiner* — William R Alexander
*Assistant Examiner* — Ephrem Z Mebrahtu
(74) *Attorney, Agent, or Firm* — Locke Lord LLP; Tim Tingkang Xia, Esq.

(57) ABSTRACT

The invention provides an insert molded lens driving apparatus comprising a lens holder and a driving coil. The lens holder further comprises a plurality of winding posts protruding outwardly therefrom. Each of the plurality of winding posts comprises an insert member partially inserted into the lens holder. The two ends of the driving coil are respectively wound around the plurality of winding posts and thereby to respectively electrically connect to the corresponding insert members. The insert member has a contact or contact area to which a metal component is soldered.

9 Claims, 8 Drawing Sheets

INSERT MOLDED LENS DRIVING APPARATUS

RELATED APPLICATIONS

This application claims priority to Taiwan Application Serial Number 104129909, filed on Sep. 10, 2015, which is incorporated by reference herein in its entirety.

BACKGROUND

Technical Field

The present invention relates to a lens driving apparatus, and more particularly, to a lens driving apparatus having an insert molded structure.

Description of Related Art

Figure 1:
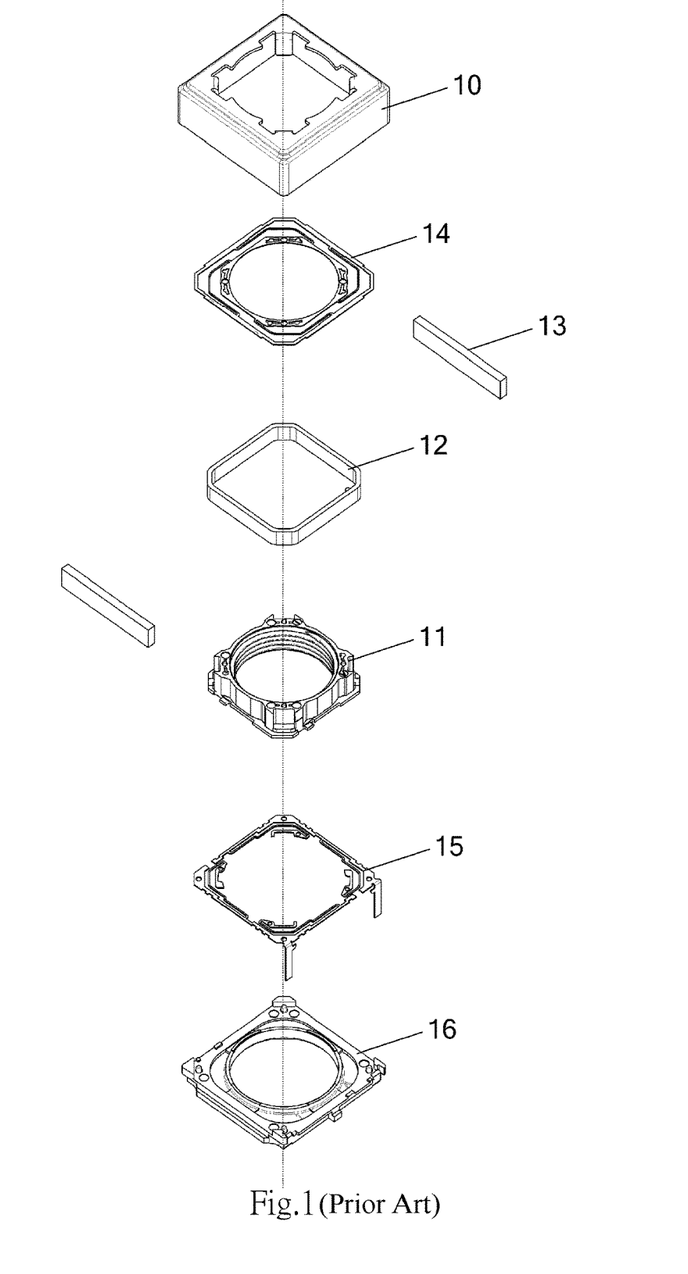
FIG. 1 is an exploded view of a prior art lens driving apparatus.

Electromagnetic actuators have been widely used in driving lenses. Referring to FIG. 1, a lens driving apparatus equipped with such an electromagnetic actuator generally includes (but not limited to the following components), in a sequential order along an image formation direction, a housing 10, a lens holder 11, a coil 12, a plurality of magnets 13, an upper leaf spring 14, a lower leaf spring 15 and a base 16, which are assembled substantially along a Z axis (optical axis) direction. After the above components have been assembled, the housing 10 covers the base 16 in a manner such that an accommodation space is defined between the housing 10 and the base 16 to receive therein the remaining components 11-15. The lens holder 11 is configured to hold a lens (not shown). The coil 12 is installed onto an outer circumference of the lens holder 11 and becomes a part of the lens holder 11. The upper leaf spring 14 and the lower leaf spring 15, which is electrically connected to the wires at two ends of the coil 12, are disposed in the accommodation space to sandwich therebetween the lens holder 11. The plurality of magnets 13 are arranged around and spaced apart from the coil 12. After the above components have been assembled, the electromagnetic induction generated when an electric current is supplied to the coil 12 will cause the lens holder 11 to move substantially in the Z axis direction.

Generally, some of the above components are connected with adhesives. Connections among these components may break under intensive operation, resulting in the loss of control in driving the lens. For example, a portion of the lower leaf spring 15 is securely connected to the lens holder 11 while another portion of the lower leaf spring 15 is securely connected to the base 16. In this lens driving apparatus, the lower leaf spring 15 mainly serves to perform electric conduction to transmit control signals from the base 16 to the coil 12 of the lens holder 11. Once the above connections break, the lower leaf spring 15 may be in weak contact with the lens holder 11 or the base 16, causing an interruption of the circuit.

Therefore, there is a need in the art for a lens driving apparatus comprising components with improved mechanical functionality and reliability.

SUMMARY

An object of the present invention is to provide an insert molded lens driving apparatus having a solderable structure.

In order to accomplish the abovementioned object, the present invention provides a lens driving apparatus, comprising: a lens holder comprising a plurality of winding posts extending outwardly therefrom and respectively comprising an insert member, the insert members being spaced apart from each other and partially inserted to the lens holder; and a driving coil installed on an outer circumference of the lens holder, two ends thereof being respectively wound around the plurality of winding posts and electrically connected to the corresponding insert members of the plurality of winding posts.

Alternatively, the insert member is an insert piece disposed on the lower surface of the lens holder.

The lens driving apparatus can further comprise a base. The base can be provided with a metallic insert member extending from an upper surface thereof to a lower surface thereof.

With the insert member structure of the present invention, the connecting interfaces of various components (e.g. the lens holder) in the lens driving apparatus are provided with solderable contacts or contact areas so that the connecting components (e.g. the leaf spring) can be soldered thereto instead of being securely connected thereto with adhesives.

The foregoing aspects and other aspects of the present invention will be fully described with exemplary embodiments below by reference to the appended drawings.

DETAILED DESCRIPTION

The present invention will be fully described by way of preferred embodiments and appended drawings to facilitate the understanding of the technical features, contents and advantages of the present invention and the effect to be achieved by the present invention. It will be understood that the appended drawings are merely schematic representations and may not be illustrated according to actual scale and precise arrangement of the implemented invention. Therefore, the scope of protection of the present invention shall not be construed based on the scale and arrangement illustrated on the appended drawings and limited thereto.

Unless the context clearly indicates otherwise, the terms used herein should be interpreted as carrying definite, relevant meanings. For example, the phrase "in one embodiment" can, but not necessarily, refer to the same embodiment. Moreover, the phrases "in another embodiment" or "in other embodiments" can, but not necessarily, refer to different embodiments. As will be described below, various embodiments of the present invention can be combined without departing from the scope or spirit of the present invention.

Unless the context clearly indicates otherwise, the term "or" as used herein refers to a nonexclusive "or" that includes the meaning of the term "and/or". Unless the context clearly indicates otherwise, the phrase "based on" should be interpreted as having a nonexclusive meaning, that is, it is possible to base on other factors not described herein. As used herein, the singular forms "a/an", "the" and "said" are intended to include the plural forms as well. The term "within" should be interpreted as carrying the meanings of "within" and "above".

Each of the following exemplary embodiments is mainly described with a lens holder of a lens driving apparatus and its peripheral components so that a person having ordinary knowledge in the art can understand the spirit of the present invention. It is to be noted that the technical solution of the present invention can be applied to similar structures in the lens driving apparatus.

The First Embodiment

FIGS. 2 through 5 illustrate an insert molded lens driving apparatus in accordance with a first embodiment of the present invention. The driving apparatus comprises a lens holder 21, a coil 22 and a lower leaf spring 25. Detailed features of each component will be described below.

Figure 2:
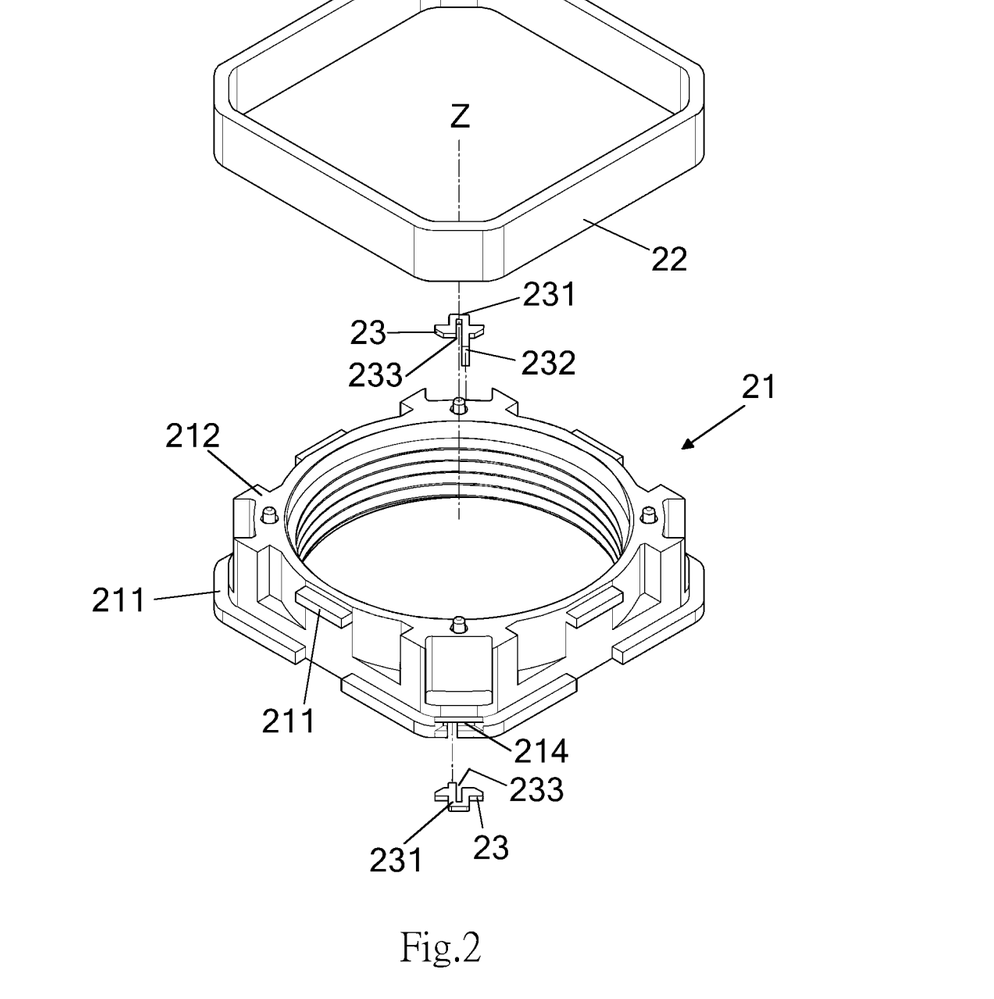
FIG. 2 is an exploded top view of a lens holder in accordance with a first embodiment of the present invention.
Figure 3:
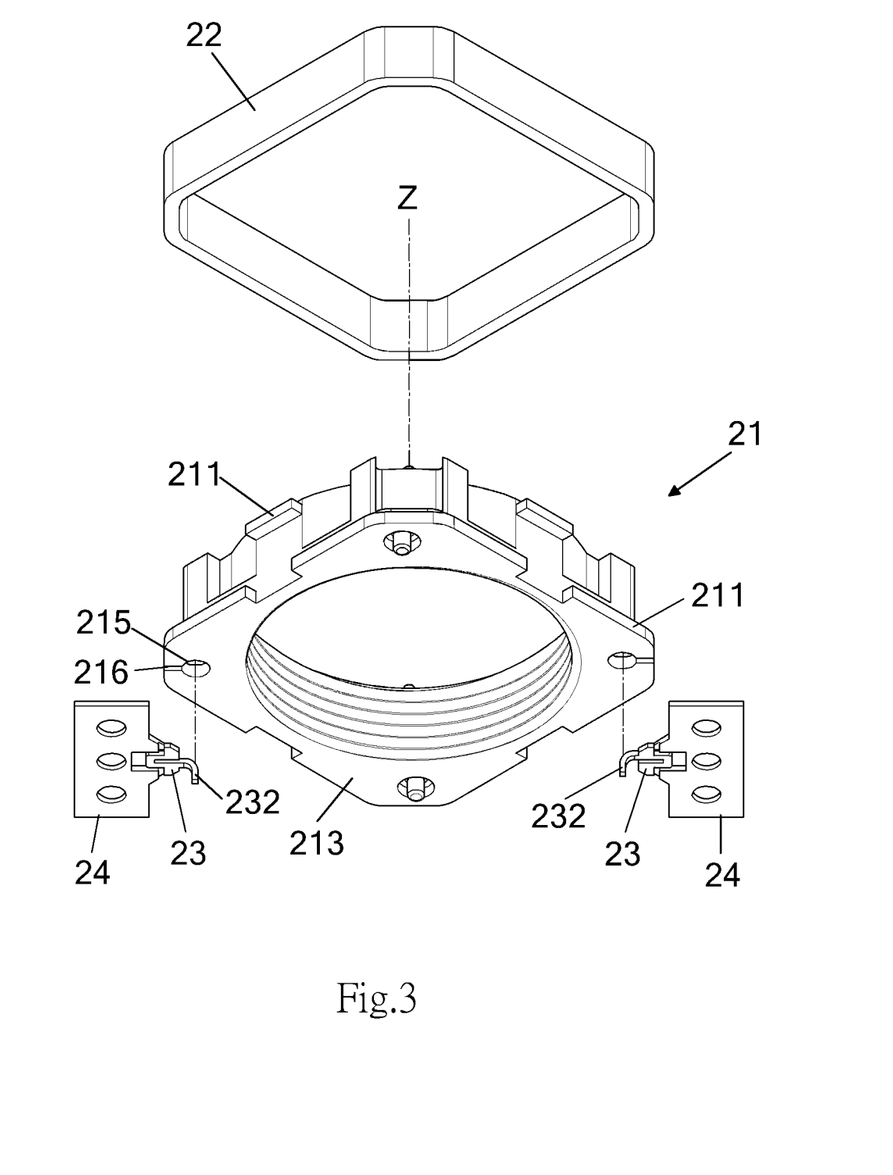
FIG. 3 is an exploded bottom view of the lens holder in accordance with the first embodiment of the present invention.

Referring to FIGS. 2 and 3, the lens holder 21, like the lens holder 11 in FIG. 1, is configured to hold one or more lenses (not shown). The Z axis represents the direction in which the components are assembled and is substantially in parallel with an optical axis. The lens holder 21 is substantially annulus in shape. A specific structure is formed at the outer circumference of the lens holder 21 so that the outer circumference of the lens holder 21 has a substantially rectangular shape. The coil 22 is secured to the outer circumference of the lens holder 21. As shown in the drawings, the lens holder 21 has a plurality of protruding position-limiting elements 211 (i.e. extending in a direction perpendicular to the Z axis) on an external surface thereof so as to retain the coil 22 therebetween. The lens holder 21 has an upper surface 212 and a lower surface 213 which are substantially perpendicular to the Z axis. The coil 22 can be positioned between the upper surface 212 and the lower surface 213 by means of the plurality of position-limiting elements 211. The upper surface 212 can be connected with other components, such as the upper leaf spring 14 in FIG. 1, and the lower surface 213 can be connected with the lower leaf spring 25 in FIG. 5. The connection of the lens holder 21 with the lower leaf spring 25 will be described below.

As shown in FIG. 2, the lens holder 21 further defines a plurality of insert slots 214 extending inwardly from the outer circumference thereof. The insert slot 214 can have a specific shape so as to receive an inserted item having a shape corresponding thereto. As shown in FIG. 3, a plurality of holes 215 and a plurality of slits 216 extending therefrom are defined on the lower surface 213 of the lens holder 21 at locations corresponding to the locations of the plurality of insert slots 214. Each of the plurality of insert slots 214 communicates with a corresponding one of the plurality of holes 215 and a corresponding one of the plurality of slits 216. In other words, the lens holder 21 defines a plurality of passages extending from the outer circumference thereof to the lower surface 213 thereof.

Figures 4A, 4B:
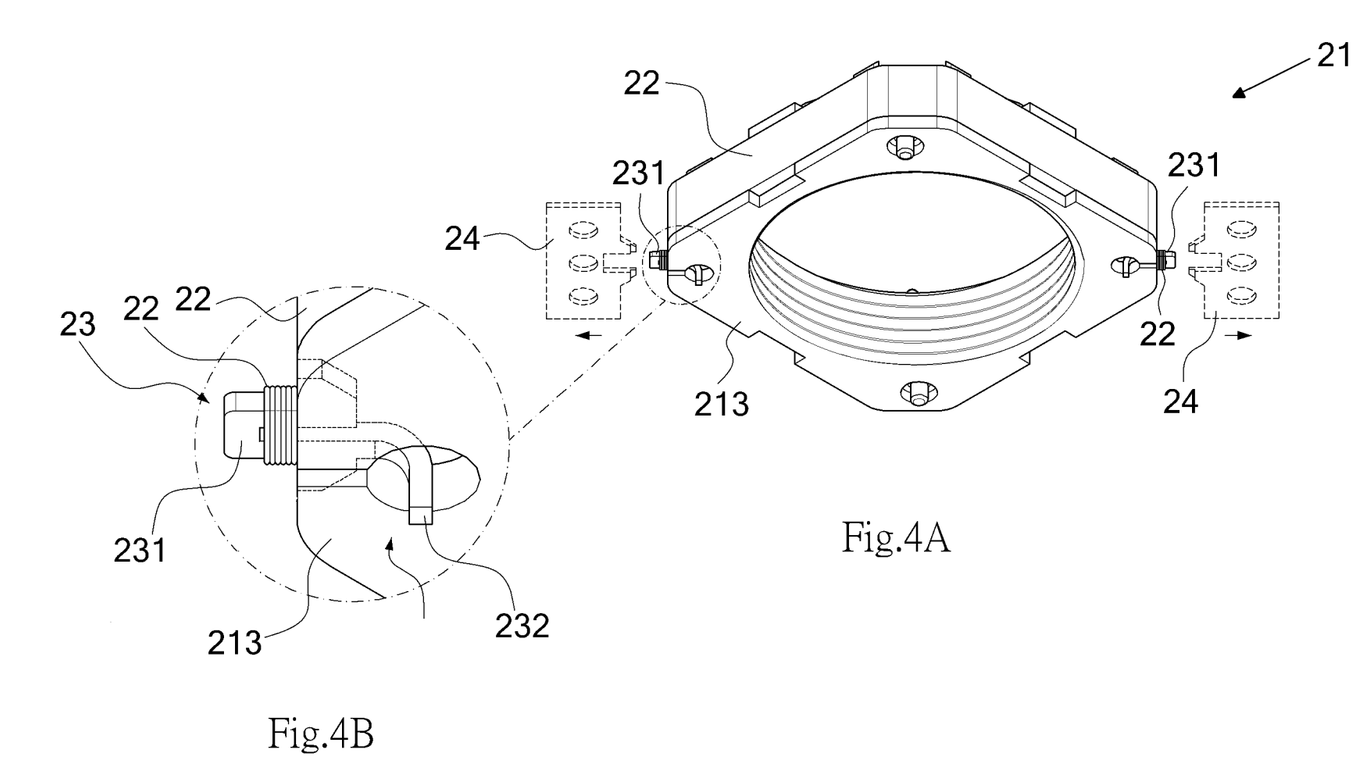
FIG. 4A is a bottom view of the assembled lens holder in accordance with the first embodiment of the present invention.
FIG. 4B is an enlarged partial view of FIG. 4A.

The plurality of insert slots 214 are defined so that a plurality of insert members 23 can be inserted into the lens holder 21. The insert member 23 is configured to have a size and/or a shape corresponding to the size and/or the shape of the insert slot 214. The insert member 23 has a first connecting end 231 and a second connecting end 232 which are electrically connected with each other. The second connecting end 232 is a pin extending along the Z axis from the insert member 23. When the insert member 23 is inserted into the insert slot 214, the second connecting end 232 thereof will move along the slit 216 to enter the hole 215. As shown in FIGS. 4A and 4B, when the insert member 23 is inserted into the insert slot 214, the second connecting end 232 enters the hole 215 and protrudes from the lower surface 213, and the first connecting end 231 protrudes from the outer circumference of the lens holder 21. In another embodiment, a distal portion of the second connecting end 232 can be at the same level with the lower surface 213 or at a level not in excess of the level of the lower surface 213. Preferably, the insert member 23 can be configured to have an engaging structure 233 through which the insert member 23 is inserted into the insert slot 214 to engage with a corresponding structure (not shown) pre-installed within the insert slot 214, thereby facilitating the connection of the insert member 23 to the insert slot 214. The insert member 23 can be made partially or entirely of a metal material. Preferably, the first connecting end 231 and the second connecting end 232 are made of a metal material.

Regarding the installation of the insert member 23, the insert member 23 and a positioning member 24 can be simultaneously formed in advance, as shown in FIG. 3. The positioning member 24 can be made of a metal material. The positioning member 24 can be operated by an automatic control system to hold the first connecting end 231 of the insert member 23 and to precisely insert the insert member 23 into the insert slot 214. Alternatively, the insert member 23 can be integrally formed on the lens holder 21 with the insert molding method.

Figure 5:
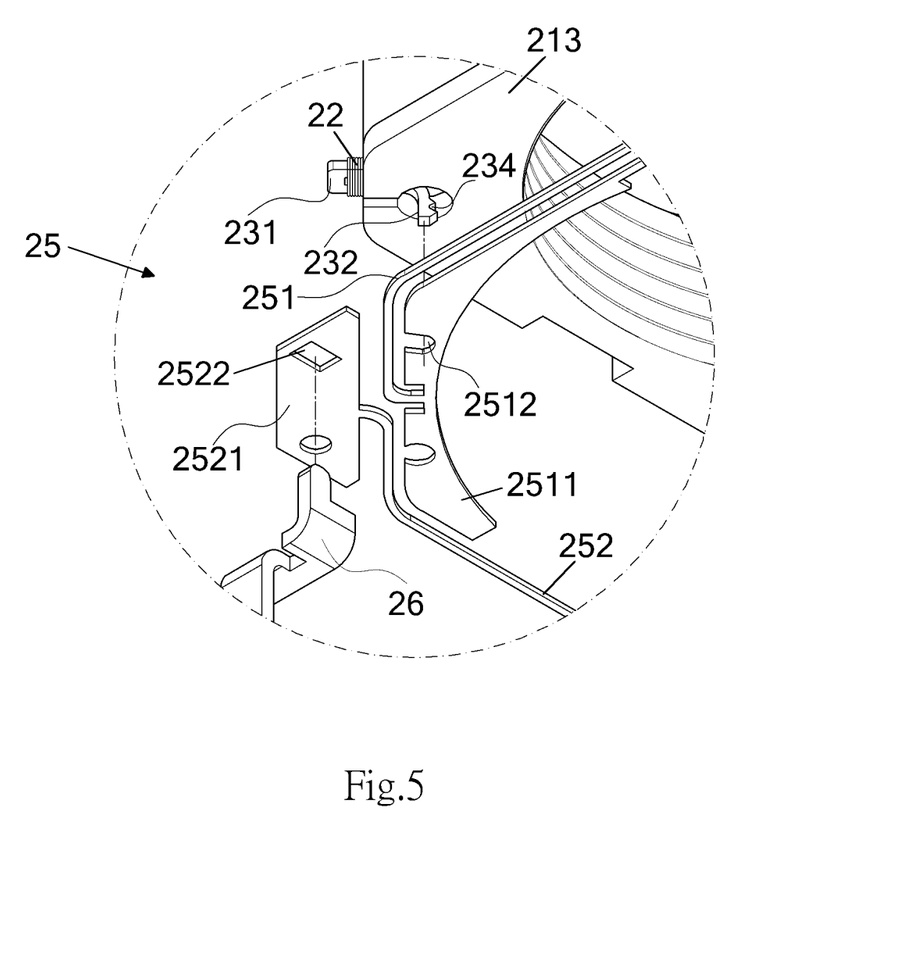
FIG. 5 is an exploded partial bottom view of the lens holder in accordance with the first embodiment of the present invention.

As shown in FIG. 4A, the positioning member 24 is removed from the insert member 23 immediately after the insert member 23 has been positioned in the insert slot 214. The first connecting ends 231 protruding from the outer circumference of the lens holder 21 serve as winding posts that have sufficient areas to connect with the two ends of the coil 22, respectively. As shown in FIG. 4B, the respective ends of the coil 22 can be wound around or soldered to the first connecting ends 231. As the first connecting end 231 and the second connecting end 232 of each of the plurality of insert members 23 are electrically connected, the electric conduction between the coil 22 connected to the first connecting end 231 and the second connecting end 232 is formed. In other words, an electric conductive path is formed through the connection of the plurality of insert members 23 and the coil 22. As shown in FIG. 5, a projecting tooth-shaped structure 234 can be provided at the second connecting end 232 to favorably connect the lower leaf spring 25.

FIG. 5 shows the connection of the lens holder 21 assembled according FIG. 4B with the lower leaf spring 25. Typically, the lower leaf spring 25 has a substantially annular shape and comprises a first leaf spring piece 251 and a second leaf spring piece 252 which are spaced apart from each other. A person having ordinary knowledge in the art should be able to conceive of applicable specific structures for the lower leaf spring based on the existing techniques for driving lenses, thus relevant details will not be provided herein. FIG. 5 partially shows the first leaf spring piece 251 and the second leaf spring piece 252. Each of the first leaf spring piece 251 and the second leaf spring piece 252 is further divided into two portions securely connecting to the lens holder 21 and a base (e.g. the base 16 in FIG. 1), respectively.

FIG. 5 shows a curved arm 2511 on the first leaf spring piece 251 and a contact pad 2521 on the second leaf spring piece 252. The curved arm 2511 is configured to contact the lower surface 213 of the lens holder 21 to support the lens holder 21. A cutout 2512 is defined at one side of the cured arm 2511 at a position corresponding to the second connecting end 232 of the insert member 23 and engages with the projecting tooth 234 of the second connecting end 232. The soldering is performed at an area where the cutout 2512 engages with the projecting tooth 234 so that the first leaf spring piece 251 of the lower leaf spring 25 is securely connected to one of the plurality of insert members 23. Similarly, the second leaf spring piece 252 is securely connected to another insert member 23 (not shown) in the same manner. Accordingly, two ends of the electric conductive path respectively extend to the first leaf spring piece 251 and the second leaf spring piece 252 of the lower leaf spring 25.

The contact pad 2521 of the second leaf spring piece 252 has a mounting hole 2522 defined at a location corresponding to the location of a protrusion on the base. As shown in FIG. 5, the contact pad 2521 is conjoined to respective one of a plurality of electric pins 26 through the mounting hole 2522, and the soldering can be performed at an area where the contact pad 2521 and the electric pin 26 are conjoined. The plurality of electric pins 26 can be integrally formed with the base by insert molding and spaced apart from each other. Accordingly, the second leaf spring piece 252 is securely connected to the base and electrically connected to one of the plurality of electric pins 26. Similarly, the first leaf spring piece 251 is securely connected to the base and the corresponding electric pin 26 in the same manner. Accordingly, the two ends of the electric conductive path respectively extend to the plurality of electric pins 26. The plurality of electric pins 26 are electrically connected to a control circuit (not shown) configured to generate driving signals for controlling the lens driving apparatus.

According to the above exemplary description, the connections among the lens holder, leaf springs and base in the lens driving apparatus are established through the metallic members inserted into the lens holder and base, and these metallic members can be secured by soldering. Compared with the securing by an adhesive, the means described in the above embodiment can improve the mechanical functionality of the lens driving apparatus and reliability of the electric conductive path.

The Second Embodiment

Figure 6:
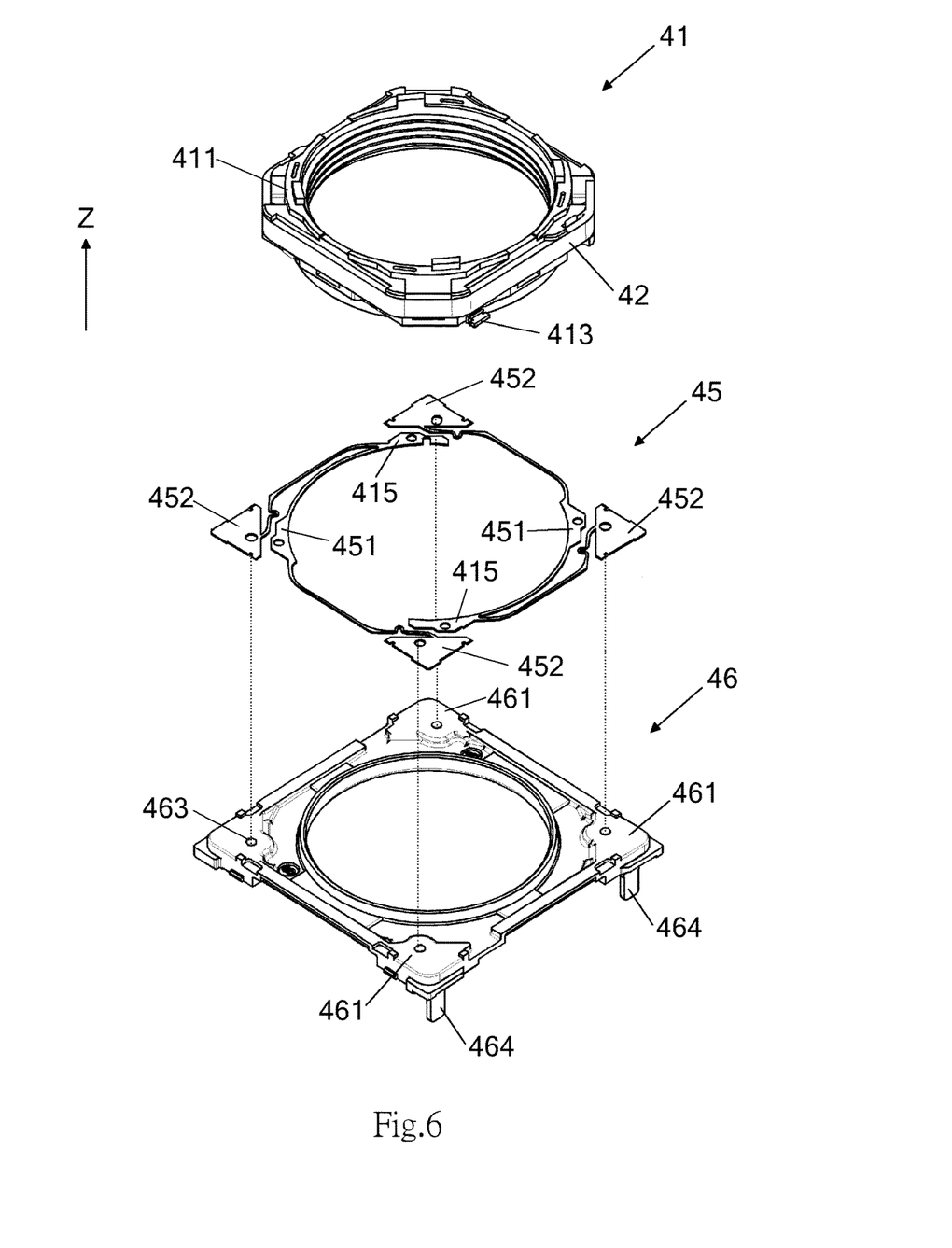
FIG. 6 is an exploded top view of a lens holder in accordance with a second embodiment of the present invention.
Figure 7:
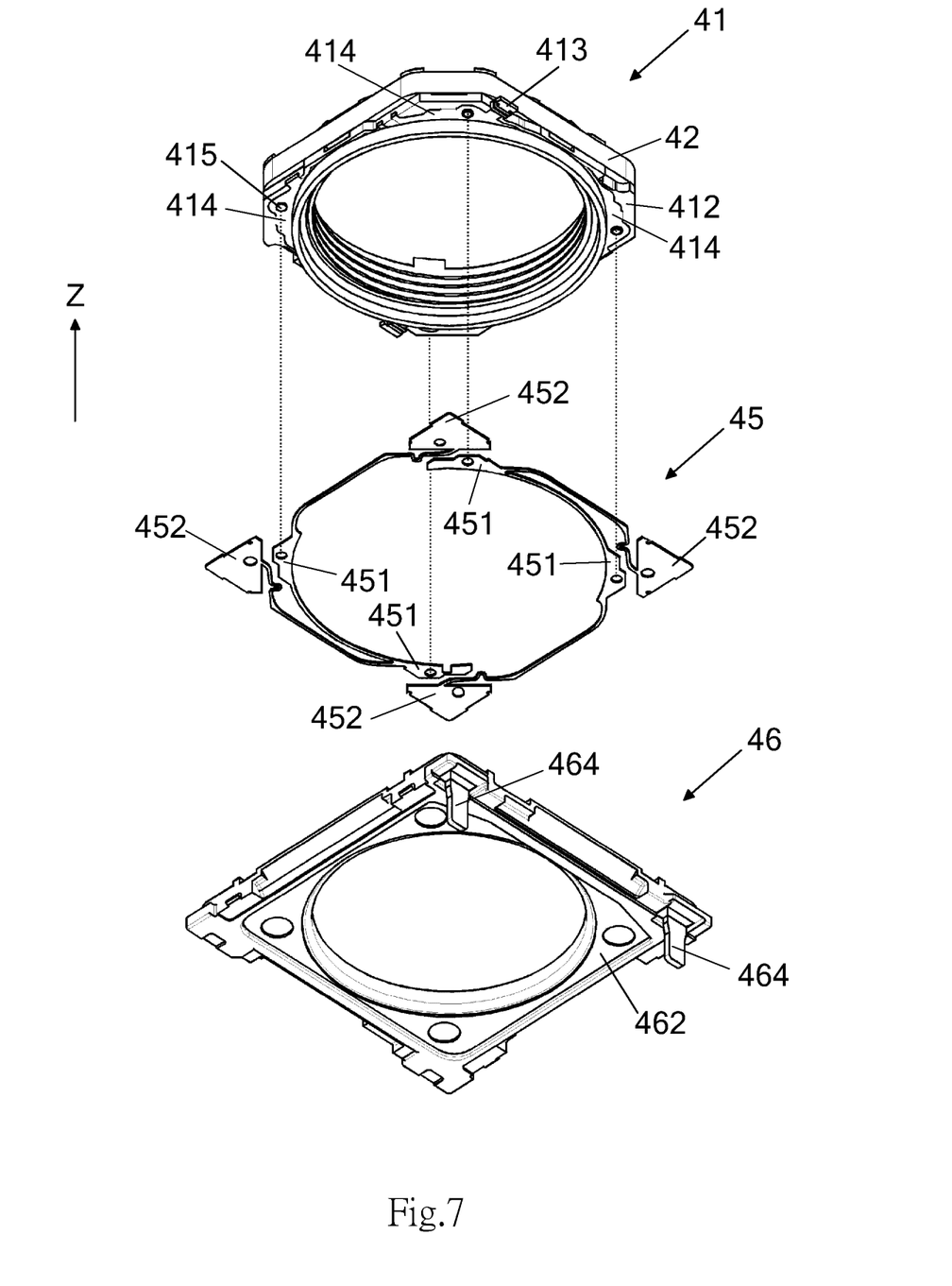
FIG. 7 is an exploded bottom view of the lens holder in accordance with the second embodiment of the present invention.

FIGS. 6 through 7 illustrate an insert molded lens driving apparatus in accordance with a second embodiment of the present invention. The driving apparatus comprises a lens holder 41, a coil 42, a lower leaf spring 45 and a base 46 along an optical imaging direction. Detailed features of each component will be described below.

Please refer to relevant description of the first embodiment for the assembly of the lens holder 41 and the coil 42. The lens holder 41 has an upper surface 411 and a lower surface 412. The lens holder 41 has a plurality of winding posts 413 formed at an outer circumference thereof and extending therefrom. The plurality of winding posts 413 are positioned between the upper surface 411 and the lower surface 412 of the lens holder 41. Preferably, the plurality of winding posts 413 are positioned in proximity to the lower surface 412 or extend from the lower surface 412. As shown in FIGS. 6 and 7, the directions in which the plurality of winding posts 413 extend are substantially perpendicular to the Z axis. The plurality of winding posts 413 can be formed integrally with the lens holder 41 by injection molding. The winding posts 413, like the first connecting ends 231 of the plurality of insert members 23 in the first embodiment, are wound around by two ends of the coil 42, respectively.

The lens holder 41 further comprises an insert member composed of a plurality of insert pieces 414 for soldering connection and/or electrical connection. As shown in FIG. 7, the plurality of insert pieces 414 are formed on the lower surface 412 of the lens holder 41 and spaced apart from each other. The plurality of insert pieces 414 extend along the lower surface 412 and are substantially perpendicular to the Z axis. One surface of each of the plurality of insert pieces 414 can be provided with a positioning point 415 configured to be aligned with the lower leaf spring 45 during the assembling process. The plurality of insert pieces 414 can be integrally formed with the lens holder 41 by insert molding.

Figure 8A:
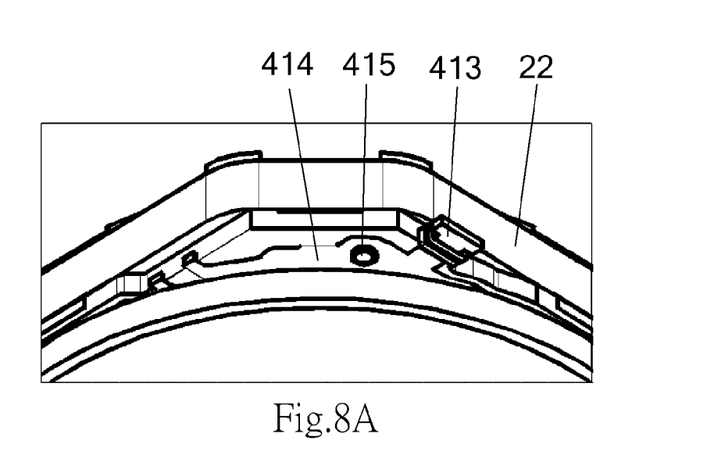
FIG. 8A is an enlarged partial bottom view of the lens holder in accordance with the second embodiment of the present invention.

The insert piece 414 partially extends to the surface of the winding post 413. As shown in FIG. 8A, an insert piece 414 can extend along the lower surface 412 to the winding post 413 in the same plane so that the coil 42 wound around the winding post 413 is electrically connected to the insert piece 414. Accordingly, an electric conductive path is formed between the insert piece 414 of the winding post 413 and the coil 42.

Referring to FIGS. 6 and 7, the base 46 has an upper surface 461 and a lower surface 462. The base 46 comprises a metallic insert member extending from the upper surface 461 thereof to the lower surface 462 thereof. Specifically, the metallic insert member comprises a plurality of electric contacts 463 distributed over the upper surface 461 of the base 46 and a pair of electric pins 464 extending from the lower surface 462 of the base 46, partially inserted into the base 46 and electrically connected to the electric contacts in the proximity thereof. Similarly, the base 46, the plurality of electric contacts 463 and the pair of electric pins 464 can be integrally formed by insert molding. The electric contact 463 can have a protruding shape so as to be aligned with and connected to the lower leaf spring 45. Moreover, an area of the upper surface 461 of the base 46 in contact with the lower leaf spring 45 can be metallic so as to facilitate the soldering.

The lower leaf spring 45, like the one in the first embodiment, has two separate leaf spring pieces, each of which has a curved arm 451 and a contact pad 452 for connecting to the lens holder 41 and the base 46, respectively. As shown in the drawings, the curved arms 451 and the contact pads 452 have respective positioning holes (not marked in the drawings) corresponding to the positioning points 415 on the plurality of insert pieces 414 and the plurality of electric contacts 463 on the base 46. The curved arms 451 of the lower leaf spring 45 are in contact with the corresponding insert pieces 414 in an aligned manner, and the contact pads 452 of the lower leaf spring 45 are in contact with the upper surface 461 of the base 46 in an aligned manner. The soldering is performed at areas where the curved arms 451 and the contact pads 452 of the lower leaf spring 45 are in contact with the insert pieces 414 of the lens holder 41 and the upper surface 461 of the base 46 so that the lower leaf spring 45 is partially securely connected (including electrically connected) to the lens holder 41 and partially securely connected (including electrically connected) to the base 46. The contact area defined by the shape and size of the curved arm 451 should at least overlap the corresponding insert piece 414. Accordingly, the electric conductive path extends through the lower leaf spring 45 to the electric pins 464 of the base 46. The electric pins 464 can be electrically connected to a driving circuit to receive driving signals for driving the lens.

Figure 8B:
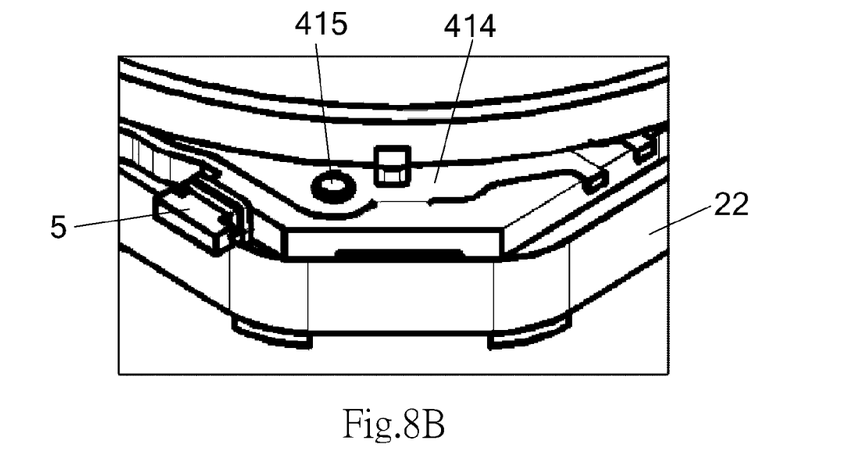
FIG. 8B is an enlarged partial bottom view showing another configuration of the lens holder in accordance with the second embodiment of the present invention.
Figure 8C:
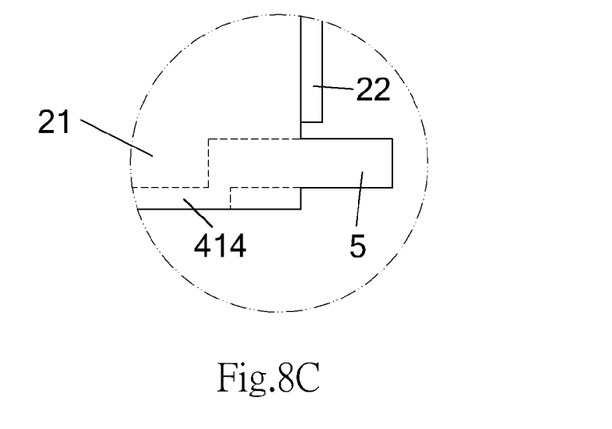
FIG. 8C is a partial section view of an insert structure shown in FIG. 8B.

FIG. 8B shows another configuration of this embodiment. The winding post 413 can be replaced with an insertion-type winding post 5. Specifically, the insertion-type winding post 5 can extend from one end of the insert piece 414 and be integrally formed with the lens holder 41 by insert molding, as shown in FIG. 8C. The insertion-type winding post 5 can extend through the lens holder 41 to the corresponding insert piece 414. In other words, the insert piece 414 and the insertion-type winding post 5 can be integrally formed as a metallic semi-product prior to the insert molding process. Accordingly, the insert piece 414 is not required to extend to the winding post, and the two ends of the coil 42 will be electrically connected to the insert pieces 414 when wound around the insertion-type winding posts 5.

According to the first embodiment and the second embodiment described above, the specific structure of the insert member enables the components of the insert molded lens driving apparatus of the present invention, such as the lens holder, the leaf springs and the base, to be interconnected, and these components are securely connected by soldering rather than using an adhesive. Although not described in the above embodiments, a person having ordinary knowledge in the art is capable of applying similar insert members to the upper surface of the lens holder or other similar structures so as to facilitate the connection of other components. In addition to the structures disclosed in the drawings, the insert member can have a variety of different configurations and affixed structures so as to facilitate the secure insertion of components into the main body. In other potential embodiments, a winding post can be configured to include two insert members around which two ends of a coil can be wound.

The preferred embodiments of the insert molded lens driving apparatus of the present invention have been described by reference to the appended drawings. All the features disclosed herein can be combined with other methods, and every feature disclosed herein can be optionally replaced with a feature with the same, equivalent or similar effect. Therefore, except for particularly distinct features, any feature disclosed herein is an example of identical or similar features. With the preferred embodiments described above, a person skilled in the art understands that the present invention possesses novelty, inventive step and practical applicability. Any modification to the present invention without departing from the scope of the claims can be made by a person skilled in the art.

What is claimed is:

1. A lens driving apparatus comprising a lens holder holding at least one lens and a driving coil having two ends and installed on an outer circumference of the lens holder, characterized in that the lens holder comprises:
    an upper surface and a lower surface;
    a plurality of winding posts protruding outwardly therefrom; and
    a plurality of insert members integrated into the lens holder and respectively extending to the corresponding winding posts, the plurality of insert members being spaced apart from each other, each of the plurality of insert members having a first connecting end extending along a first direction to a corresponding one of the plurality of winding posts and a second connecting end extending along a second direction, and the plurality of insert members electrically connected to a lower leaf spring, and the first connecting end and the second connecting end being electrically connected, and the first direction and the second direction are different;
    wherein the two ends of the driving coil are respectively wound around the plurality of winding posts so that the driving coil is electrically connected to the lower leaf spring.

2. The lens driving apparatus of claim 1, wherein the plurality of winding posts are disposed between the upper surface and the lower surface of the lens holder.

3. The lens driving apparatus of claim 1, wherein the second connecting end of each of the plurality of insert members protrudes from the lower surface of the lens holder.

4. The lens driving apparatus of claim 1, wherein the second connecting end of each of the plurality of insert members extends along the lower surface of the lens holder.

5. The lens driving apparatus of claim 1, wherein the second connecting end of each of the plurality of insert members is an insert piece along the lower surface of the lens holder.

6. The lens driving apparatus of claim 5, wherein the insert piece is provided with a positioning point configured to be aligned with and connected to the lower leaf spring.

7. The lens driving apparatus of claim 5, wherein the plurality of insert pieces respectively extends to respective one surfaces of the plurality of winding posts so as to electrically connect the two ends of the driving coil respectively wound around the plurality of winding posts.

8. The lens driving apparatus of claim 5, wherein each of the plurality of insert pieces partially extends from the outer circumference to the lower surface of the lens holder.

9. The lens driving apparatus of claim 1 further comprising a base comprising a plurality of electric contacts inserted into one surface of the base so as to electrically and mechanically connect the lower leaf spring.

* * * * *